United States Patent

Smith

[11] 4,017,027
[45] Apr. 12, 1977

[54] LEAD-LAG COMPENSATED TEMPERATURE SENSOR

[75] Inventor: Lawrence Sidney Smith, Simsbury, Conn.

[73] Assignee: United Technologies Corporation, Hartford, Conn.

[22] Filed: Dec. 3, 1975

[21] Appl. No.: 637,490

[52] U.S. Cl. .................. 236/99 E; 60/39.28 T; 60/39.29

[51] Int. Cl.² ...................... G05D 23/12

[58] Field of Search .......... 236/99 E, 99 R, 78 B, 236/91 F; 62/209; 60/39.28 T, 39.29

[56] References Cited

UNITED STATES PATENTS

| | | | |
|---|---|---|---|
| 2,211,672 | 8/1940 | Reeder | 236/99 E X |
| 2,266,202 | 12/1941 | Heinkel | 236/91 F |
| 2,396,284 | 3/1946 | Pearce et al. | 236/91 F X |
| 2,499,232 | 2/1950 | Strub | 60/39.28 T X |
| 2,527,117 | 10/1950 | Cobb | 236/99 E X |
| 2,989,849 | 6/1961 | Torell et al. | 60/39.28 T X |
| 3,063,239 | 11/1962 | Jensen et al. | 60/39.29 X |

Primary Examiner—William E. Wayner
Assistant Examiner—William E. Tapolcai, Jr.
Attorney, Agent, or Firm—John D. Del Ponti

[57] ABSTRACT

A lead-lag compensated gas-filled temperature sensor having an output which essentially matches, without error, the temperature of a flowing airstream in a gas turbine engine during both transient and steady state conditions comprises a pair of gas-filled temperature probes disposed in the airstream and filled with a gas which expands in response to temperature changes in the airstream at different rates, a pressure responsive means having opposite sides in closed fluid communication with the sensors for compensated movement in one direction and valve means disposed adjacent the pressure responsive means controlled by movement of the pressure responsive means to vary the hydraulic pressure in a system to be controlled.

2 Claims, 2 Drawing Figures

LEAD-LAG COMPENSATED TEMPERATURE SENSOR

BACKGROUND OF THE INVENTION

The present invention relates to a compensated temperature sensor and more particularly to a temperature sensor mechanism compensated to transmit a pressure signal in direct proportion to temperature change in a flowing airstream.

It is known in the art to sense the temperature of an airstream in order to schedule the hydraulic servo pressure of a gas turbine engine hydromechanical fuel control as a function of the sensed temperature. Although the gas-filled bulb type temperature sensor is recognized as given the fastest response and is useful in this regard, it has been too slow or inaccurate to be useful in certain other applications as for example, for providing proper control of variable or compressor stator vanes. One of the primary problems resides in the requirement that the force output of the gas-filled sensor must both increase at a rate close to the rate of increase in temperature while also leveling off at the same time and level as the steady state temperature. However, since the rate of output lags the temperature increase during a transient for a relatively long period, exhibited typically, for example, as a time constant of one-half second at 40 lb./sec/ft$^2$ airflow, means for compensating such sensors has been sought.

SUMMARY OF THE INVENTION

It is a primary object of the present invention to provide a lead-lag compensated gas-filled temperature sensor which essentially matches, without error, the temperature of a flowing airstream in a gas turbine engine during both transient and steady state conditions.

The present invention contemplates a compensated temperature responsive transmitter for accurately sensing the air temperature of a flowing airstream comprising a pair of gas-filled temperature probes disposed in the airstream and being filled with a gas which expands in response to temperature increases in the airstream at different rates, a pressure responsive means having opposite sides in closed fluid communication with the sensors for compensated movement in one direction, and valve means disposed adjacent said pressure responsive means controlled by movement of said pressure responsive means to vary hydraulic pressure in a system to be controlled.

BRIEF DESCRIPTION OF THE DRAWINGS

An understanding of the invention will become more apparent to those skilled in the art by reference to the following detailed description when viewed in light of the accompanying drawings, wherein.

DESCRIPTION OF THE PREFERRED EMBODIMENT

Figure 1:
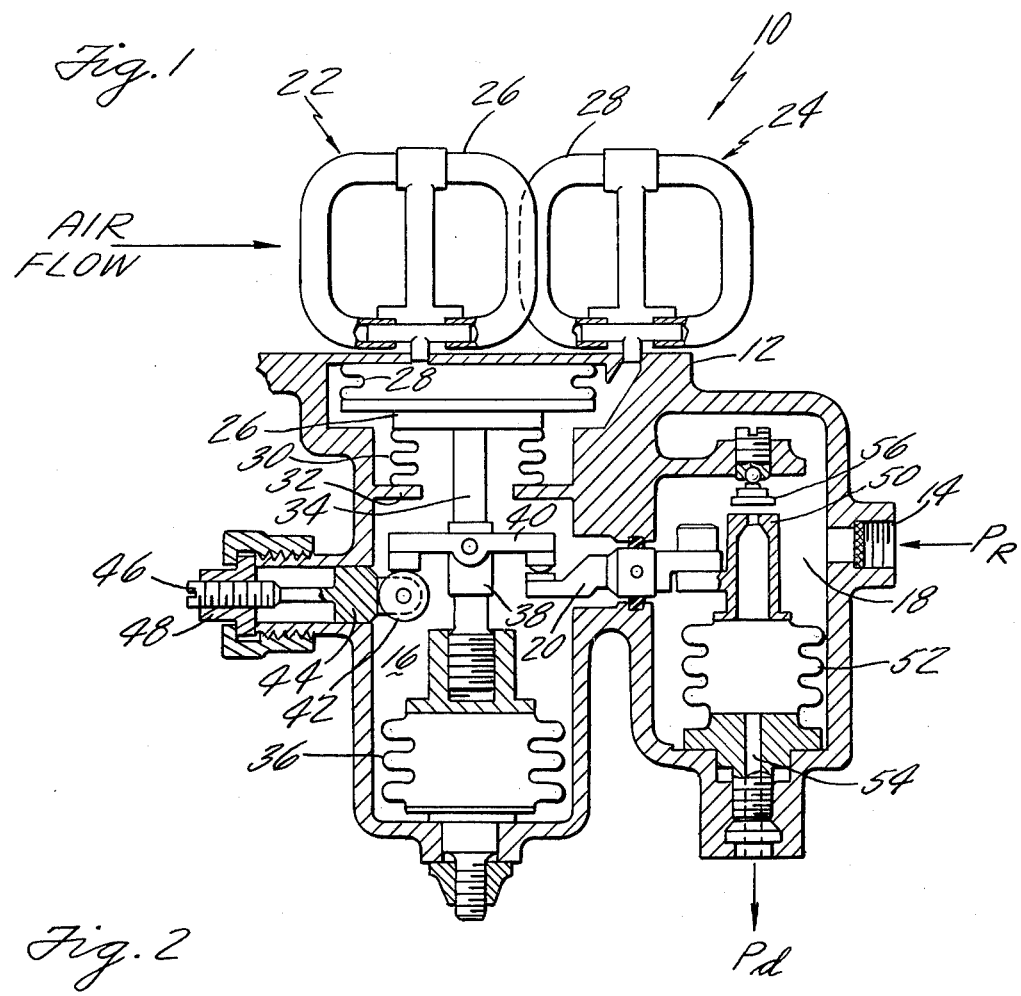
FIG. 1 is a side elevational view, partly in section, showing a compensated temperature responsive transmitter which embodies the present invention.

Referring now to FIG. 1, there is shown a compensated temperature responsive transmitter 10 having a housing 12 with an inlet 14 connected to a sourec of fluid pressure $P_R$ (not shown) such as a pilot valve in a fan discharge temperature servo of a fuel control system for a gas turbine aircraft engine.

The housing 12 is divided into separate chambers 16 and 18, the chamber 16 containing a pressure responsive mechanism and the chamber 18 containing a valve mechanism. As described more fully hereinafter, the pressure responsive mechanism is movable vertically and adapted to transmit its movement to the valve mechanism via a pivoted lever 20 which bridges the chambers 16 and 18. It will be noted that only chamber 18 received hydraulic fluid from the inlet 14 with the valve mechanism therein operating to vary the pressure of fluid flowing from inlet 14 in response to movements of the pressure responsive mechanism to thus alter the pressure in the servo valve in the main fuel control. The pressure responsive mechanism which controls the modulated pressure is itself responsive to pressure variations caused by temperature changes of the airstream flowing through a pair of gas-filled probes 22 and 24.

The probes of bulbs 22 and 24 are essentially identical in operation and construction with, however, one key difference — the probe 22 providing a faster response than the probe 24. Both of the probes comprise hollow sensor tubes 26 and 28, generally in the form of a hollow square, which are each mounted on housing 12 in the airstream and filled with a gas such as nitrogen or helium. The tubes may be made of any material suitable for the environment of the intended application. In a gas turbine, for example, a metal such as Inconel 600 is satisfactory. In order to provide differing response rates, the tubes 26 and 28 are of a differing wall thickness, the faster probe 22 having a tube wall thickness which is less than the wall thickness of the tube 28 of probe 24. Other ways of varying response rates are, of course, available such as by utilizing tubes of differing diameters, differing materials or differing shapes or by utilizing gases of different thermal capacities.

Figure 2:
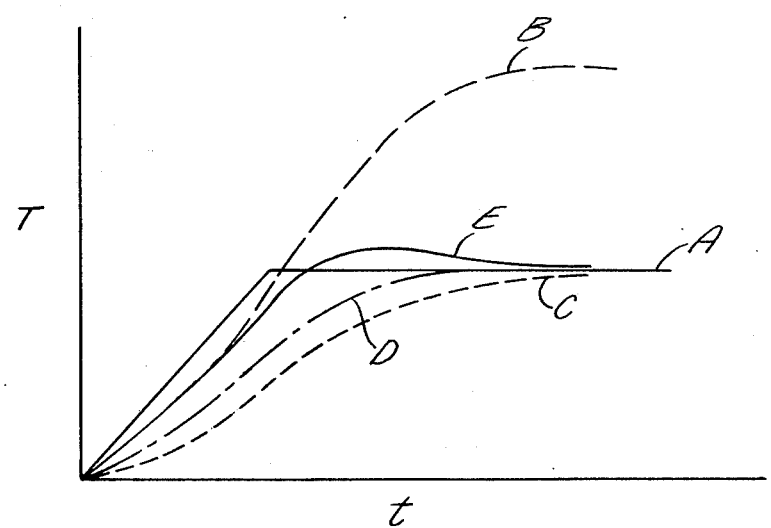
FIG. 2 is a graphical illustration showing time response characteristics ($t$) of various mechanisms as compared with actual temperature (T).

Disposed within chamber 16 is a pressure responsive element or plate 26 which is connected to the housing 12 on its upper surface via bellows 28. The lower surface of the element 26 is also secured to a bellows 30 which is attached at its other end to the housing by an annular lip 32 in the chamber 16. It is noted that the bellows 30 circumscribes an area on the under side of the plate 26 which is smaller than the area circumscribed by the bellows 28 on the upper surface of the plate of the element 26. The upper surface of the pressure responsive element 26 is in closed fluid communication with the temperature responsive bulb 22 while the underside of the element 26 external of the bellows 30 is in closed fluid communication with the slower responding bulb 24. By this arrangement, during a temperature transient, the change in gas pressure in the fast probe 22 acting on the relatively large area provides a greater rate of change of force than the change in gas pressure in the slow probe 24 acting on the relatively small area. The large force change on the upper side of the element 26 is thus partially cancelled by the smaller one acting on the difference in areas circumscribed by the bellows 28 and 30 so that a steady state force output closely following the temperature transient is achieved. By properly selecting the areas circumscribed by the respective bellows as well as the time constant of the slow probe, the temperature of the airstream, depicted as curve A in the graph of FIG. 2, is accurately tracked. In FIG. 2, temperature (T) (or force output) is plotted against time (*t*). Curve B represents the output of a fast probe, such as probe 22, which closely follows an increase in temperature, but which levels off at too high a value. Curve C represents the output of a slow probe, such as probe 24, which slowly increases with (T). Curve D represents the closest tracking achievable by a single probe. Curve E represents the compensated output of the present invention.

Axially disposed in the chamber 16 and extending downwardly from the pressure responsive element 26 is a force output rod 34. The rod 34 is rigidly connected at its upper end to the element 26 and at its lower end to an evacuated reference bellows 36. Mounted on the rod 34 by means of a collar 38 is a pivotable cross arm 40 for transmitting axial movement of the rod 34 to the lever 20. As shown in the drawing, the left arm portion of the cross arm 40 engages the upper circumferential surface of a cylindrical stop 42 while the right hand portion of the cross arm 40 engages the left arm of lever 20. In order to adjust the angular relationship of the cross arm 40 and lever 20, the cylinder 42 is mounted on a lug 44 with its axis perpendicular to that of the rod 34. The lug 44 is adjustably movable toward or away from the rod 34 by means of shaft 46 which is threaded at its opposite end in collar 48 secured to the housing 12.

As previously indicated, the interior of the bellows 36 is evacuated. Chamber 16 is connected to ambient pressure through a small hole (not shown) in housing 12. The area (effective cross-sectional area) of the evacuated bellows 36 is made equal to the area of bellows 30 so that changes in pressure in chamber 16 are felt equally in both directions and thus do not change the force output of rod 34.

Focusing attention now on chamber 18, it can be seen that there is disposed therein a vertically movable flapper nozzle 50 suitably connected to the right arm of the lever 20. The nozzle element 50 has its lower end secured to a bellows 52 which has its lower end rigidly connected to housing 11. An outlet passageway 54 communicates the interior of the bellows 52 to drain at pressure $P_d$. An adjustable flapper 56 is disposed opposite the flapper nozzle 50.

In operation, the pressurized fluid enters inlet 14 and passes through the nozzle 50, creating a predetermined pressure drop thereacross as determined by the distance between the nozzle 50 and the flapper 56. As the temperature of the air flow increases, the gas in the fast reacting bulb 22 increases in pressure at a rate faster than that in the slow reacting bulb 24 thus causing a compensated output force or downward movement of the pressure responsive element 26 and output rod 34. The downward movement of the rod 34 is transmitted via cross arm 40 to pivot the lever 20 in a counterclockwise direction thus causing nozzle 50 to move toward the flapper 56 and decrease the nozzle flow into the transmitter bellows 52. Concomitantly, $P_R$ increases with the pressure in the chamber 18 external of the bellows 52 operating, after a predetermined increase, to urge the bellows and hence the nozzle 50 downwardly.

What has been set forth above is intended primarily as exemplary to enable those skilled in the art in the practice of the invention and it should therefore be understood that, within the scope of the appended claims, the invention may be practiced in other ways than as specifically described.

I claim:

1. A compensated temperature responsive transmitter for sensing air temperature of an airstream comprising:
    a housing having a first and a second chamber;
    a pressure responsive element disposed in said first chamber;
    a first gas-filled temperature responsive bulb disposed in said airstream;
    first bellows between said first bulb and a first area on one side of said element for putting said first bulb in closed fluid communication with said first area to urge it in one direction;
    a second gas-filled temperature responsive bulb disposed adjacent said first bulb in said airstream;
    second bellows between said second bulb and a second area on the opposite side of said element for putting said second bulb in closed fluid communication with said second area to urge said element in an opposite direction;
    said first and second areas being of different magnitude;
    said first and second bulbs responding to a temperature change in said airstream at different rates;
    inlet means in said second chamber for communicating said second chamber with a supply of fluid under pressure;
    valve means disposed in said second chamber for varying the pressure of said supply fluid; and
    means responsive to said movement of said pressure responsive element connected to said valve means for controlling the pressure of said supply fluid.

2. A compensated temperature responsive transmitter for sensing air temperature of an airstream comprising:
    a housing having a first and a second chamber;
    pressure responsive means, including a plate, disposed in said first chamber;
    a first temperature responsive bulb means disposed in said airstream and in closed fluid communication with a first surface on said plate to urge it in one direction, said first bulb means including a first bellows in said first chamber connected at one end to said housing and at the other end to said first surface on said plate;
    a second temperature responsive bulb means disposed in said airstream and in closed fluid communication with a second surface on said plate to urge it in an opposite direction, said second bulb means including a second bellows in said first chamber connected at one end to said housing and at the other end to said second surface on said plate;
    said first bulb being filled with a gas which expands in response to a temperature change in said airstream at a first rate;
    said second bulb being filled with a gas which expands in response to said temperature change in said airstream at a second rate different from said first rate;
    said pressure responsive means including a third bellows connected at one end to said housing and at the other end to said second surface, said third bellows having an effective cross-sectional area equal to the effective cross-sectional area of said second bellows;
    inlet means in said second chamber communicating said second chamber with a supply of hydraulic fluid under pressure;
    valve means disposed in said second chamber for varying the pressure of said supply fluid; and
    means responsive to movement of said pressure responsive means extending between said first and second chambers for controlling the pressure of said supply fluid.

* * * * *